Jan. 20, 1970  H. FRICKE ET AL  3,490,552
PROPORTIONING APPARATUS
Filed Sept. 27, 1967

INVENTORS:
HORST FRICKE
HEINZ MERKEL
BY: *Marzall, Johnston, Cook & Root*
ATT'YS United States Patent Office 3,490,552
Patented Jan. 20, 1970

3,490,552
PROPORTIONING APPARATUS
Horst Fricke, Frankenthal, Pfalz, and Heinz Merkel, Ludwigshafen (Rhine), Germany, assignors to Badische Anilin- & Soda-Fabrik Aktiengesellschaft, Ludwigshafen (Rhine), Germany
Filed Sept. 27, 1967, Ser. No. 670,970
Claims priority, application Germany, Sept. 30, 1966, 1,549,150
Int. Cl. G01g 19/22
U.S. Cl. 177—70                                    7 Claims

ABSTRACT OF THE DISCLOSURE

Apparatus for proportioning substances that are to be mixed with a varying weight of a reference substance in a predetermined proportion, comprising one or more weighing machines which generate voltages proportional to the weight of the substances being weighed. The voltage generated by the weight of the reference substances is set and the voltage output of the weighing machine reduced in accordance with the desired relative proportions. The substances are then fed consecutively to the weighing machine. The conveyance of the substances to the weighing machine is controlled by a switch according to the output of a voltage difference measuring device that balances the set voltage against the output voltage of the weighing machine.

---

Figure 1:
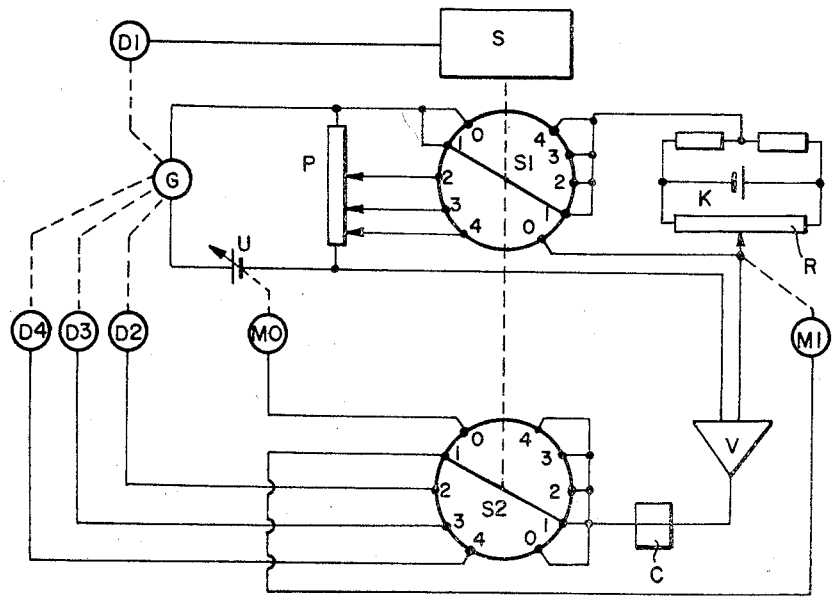

Apparatus are already known for adding a substance by means of a proportioning belt-type weight feeder in a constant ratio to a reference substance which is continuously supplied by another belt feeder, the drive means of the feeders being mechanically or electrically coupled and variations in the quantity of the reference substance being used for readjusting the speed of the motor driving the proportioning weigh feeder.

In other known apparatus for proportioning ingredients to a definite formula pulses are generated by counters that are preset according to the desired proportions and these pulses are applied to bistable multivibrators in such a way that when the multivibrators are not triggered in synchronism because of deviations from the required proportion the magnitude of the deviation is determined and servo members are actuated to effect readjustment.

These apparatus have the drawback that they can be used only for proportioning substances that are continuously supplied and that the substances that are to be mixed must be sufficiently fine-grained to permit definite tolerances in the proportions to be observed.

In other known apparatus for producing formulas proportional to a reference substance, namely an adjusting means on indicating weighers, a preset pointer positively entrains the other pointers through a preadjustable gearing to maintain a preselected proportion. This apparatus has the drawback that the gearing can be used only for producing a definite proportion and any proportion which differs therefrom requires the insertion of a different gear train. Moreover, the backlash in the gear wheels and the imprecision in indication inherent in every pointer type weighing machine precludes the apparatus from being used for analytical service where a high degree of accuracy is required.

It is the object of the present invention to provide an apparatus which permits substances to be mixed in predetermined proportions with a reference substance which may be in lumpy form and vary in weight, taking advantage of the high accuracy of electrical balances as required for example in analytical service.

In accordance with the invention this object is achieved by using a proportioning apparatus comprising at least one weighing device, said weighing device generating a voltage proportional to the weight of the substance being weighed, means for storing the voltage or a proportion thereof generated by the weight of the reference substance, means for reducing the voltage output of the weighing device in accordance with the predetermined relative proportions of the mixture as the substances are being fed consecutively to said weighing device, means for determining when the predetermined relative proportions have been set up, and means for conveying the substances to the weighing device or devices. The means for storing the voltage or a proportion thereof generated by the weight of the reference substance comprises an adjustable voltage source, i.e. a constant voltage source whose output voltage is varied by a motor-driven potentiometer according to the output of a voltage difference measuring device. The means for reducing the voltage output of the weighing device in accordance with the predetermined relative proportions of the mixture as the substances are being fed consecutively to the weighing device comprises at least one potentiometer. The means for determining when the predetermined relative proportions have been set up comprises a device measuring the difference between the stored voltage and the voltage generated by the weighing device in terms of amount and phasing, and a switch stopping conveyance of the substances in the event of phase inversion. The means for conveying the substances to the weighing device comprises valves controlled by the said switch.

Figure 2:
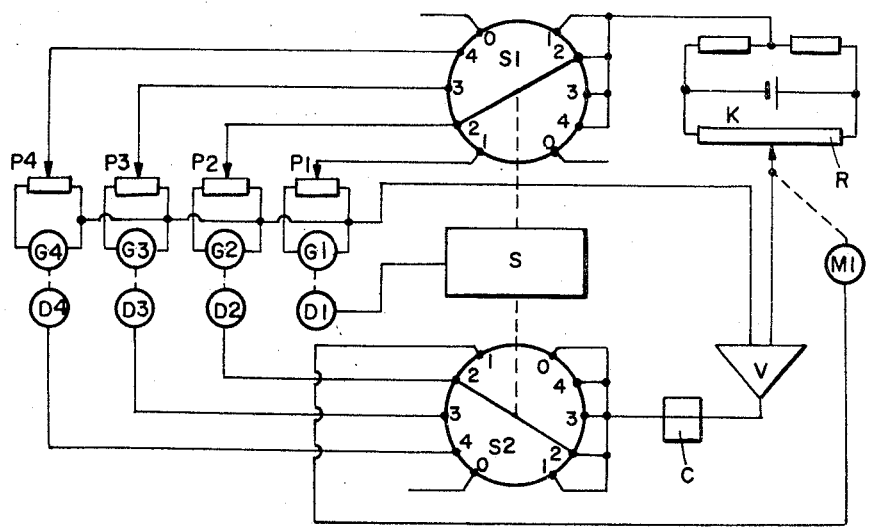

Two embodiments of the invention will now be described in greater detail, by way of example, with reference to the accompanying drawing, in which FIGURE 1 is a schematic diagram of a proportioning apparatus in which four substances that are to be mixed are weighed on one pair of scales, and FIGURE 2 is a schematic diagram of a proportioning apparatus in which four substances that are to be mixed are weighed on four separate scales.

With reference to FIGURE 1 the proposed apparatus comprises feeders D1, D2, D3 and D4, equipped with a valve for feeding the substances that are to be weighed, a control device C consisting of a voltage difference measuring device and a switch for determining when the predetermined relative proportions have been set up to enable conveyance of the substances being stopped, a pair of scales G, a potentiometer P for preselecting the desired proportions of the substances in the mixture, a selector switch means S, resolved in the diagram into two mechanically linked selector switches S1 and S2, a voltage source K containing a constant voltage source and a potentiometer R having a slider driven by a motor M1, a voltage difference measuring device V to enable the output of the scales G to be balanced by the voltage of voltage source K, and a supplementary voltage source U controlled by a servo motor MO for compensating tare weight prior to each weighing cycle.

In FIGURE 2 four scales G1, G2, G3 and G4 and associated potentiometers P1, P2, P3 and P4 are provided for weighing the substances that are to be mixed. For the sake of clarity the supplementary voltage source U and its servo motor MO are omitted in this drawing.

When using the apparatus for FIGURE 1, before each weighing cycle the scales must be balanced to eliminate tare weight, since residual quantities of substance may still have remained on the scales from a preceding weighing operation. To this end the selector switches S1 and S2 are placed in the position marked 0. The voltage generated by the scales G and representing the weight of the scales and any residual substance is thus opposed to the supplementary voltage source U and the voltage of the latter is adjusted by its associated servo motor MO until the two voltages compensate. As soon as tare weight balance has been achieved, an arbitrary quantity of a reference substance is fed onto the scales G by feeder D1. The selector switches S1 and S2 are switched to the position marked 1. The output voltage of the scales G is proportional to the weight of this reference substance. This voltage is compared with the output of the voltage source K in the difference measuring device V, and the motor driven potentiometer R adjusts the output of the voltage source K until the difference between the two voltages is negligible. The output of the voltage source K is now the same as the voltage generated by the scales G in response to the placing of the reference substance thereon.

The following measurements are then performed by simultaneously placing the two selector switches S1 and S2 consecutively into the positions marked 2, 3, and 4. In each measurement the output voltage of the voltage source K is balanced against the output voltage of the scales reduced according to preset ratios by the potentiometer P as indicated in FIGURE 1, the electrically controlled feeders D2, D3 and D4 continuing to feed each of the several substances until the proportionately reduced output voltage of the scales equals the output voltage of the voltage source K. The control device C, consisting of a voltage difference measuring device and a switch, measures the difference between the stored voltage and the voltage generated by the weighing device in terms of amount and phasing and stops conveyance of the substances in the event of phase inversion, i.e. when the two voltages are equal. When the entire batch has been weighed the pair of scales G is emptied and the system is ready for weighing the next batch.

In the apparatus illustrated in FIGURE 2, four separate weighing machines are used for weighing the several substances and two basically different operations may be carried out.

(1) The ratio of each substance to the reference substance is higher than 1. The weighing process then is analogous to that described with reference to FIGURE 1. After the reference substance has been weighed on the weighing machine G1 and the corresponding output voltage of the weighing machine has been set in voltage source K, the set voltage is consecutively compared with and balanced against the output voltages of the three weighing machines G2, G3 and G4, each reduced in proportion to the desired ratios preset on the potentiometers P2, P3 and P4.

(2) The weight of at least one substance is less than that of the reference substance. After the reference substance has been weighed on the weighing machine G1 the voltage output of the latter has to be reduced by the potentiometer P1 in proportion to the lowest of the predetermined ratios of the mixture. This reduced voltage representing the reduced weight of the reference substance is stored in voltage source K. Then the set voltage is consecutively compared with and balanced against the output voltages of the three weighing devices G2, G3 and G4, each reduced in proportion to the desired ratios preset on the potentiometers P2, P3 and P4 as described above. For the purpose of calculating the ratios to be preset on potentiometers P2, P3 and P4 in accordance with the relative proportions of the mixture, the weight of the reference substance is represented by the reduced weight, set in voltage source K.

For the production of a mixture of several substances in which these substances are present in definite ratios to the weight of a reference substance, the quantity of the reference substance can be arbitrarily varied within the limits imposed by the capacity of the weighing device. Preadjustment of the relative proportions ensures that the quantities of the other substances in the mixture will be strictly in the desired ratios to the weight of the reference substance. The apparatus according to FIGURE 2 has the further advantage that when weighing substances that are for instance to be analyzed at different times or different localities, these substances can be made available in the desired proportions from several independent weighing devices.

We claim:
1. Apparatus for proportioning one or more substances that are to be mixed with a varying weight of a reference substance in a predetermined proportion which comprises at least one weighing device, electric circuit means generating a voltage proportional to the weight of the substance being weighed; means for storing the voltage or a proportion thereof generated by the weight of said reference substance; means for reducing the voltage output of said weighing device in accordance with the predetermined relative proportions of the mixture as said substances are being fed consecutively to said weighing device; means for determining when the predetermined relative proportions have been fed to said weighing device; means for conveying said substances to said weighing device; and means operatively associated with said last-two mentioned means for stopping the conveying of said additional substances to said weighing device when the predetermined relative proportions have been fed to said weighing device.

2. Apparatus as claimed in claim 1, in which the means for storing the voltage or a proportion thereof generated by the weight of the reference substance comprises an adjustable voltage source consisting of a constant voltage source whose output voltage is varied by a motor driven potentiometer in response to the output of a voltage difference measuring device.

3. Apparatus as claimed in claim 1, in which the means for reducing the voltage output of the weighing device in accordance with the predetermined relative proportions of the mixture as substances are being fed consecutively to said weighing device comprises at least one potentiometer.

4. Apparatus as claimed in claim 1, in which the means for determining when said predetermined relative proportions have been fed comprises a voltage difference measuring device measuring the difference between the stored voltage and the voltage generated by the weighing device as the substances are being fed in terms of amount and phasing, and a last-mentioned means stopping conveyance of the substance upon phase inversion.

5. Apparatus as claimed in claim 1, in which the means for conveying said substances to said weighing device comprises valves controlled by said switch.

6. Apparatus for proportioning one or more additional substances with a reference substance of non-predetermined weight in a predetermined weight proportion of said substances which comprises weighing means; means for feeding said substances individually and successively to said weighing means; and electric circuit means controlling the weight quantity of said additional substances fed to said weighing means, said electrical circuit means including means operatively associated with said weighing means to provide a voltage output proportional to the weight of the substance being weighed, means for determining and storing in said circuit means the voltage output or a predetermined proportion thereof based on the weight of said reference substance on said weighing means, means for selectively reducing the voltage output from said weighing means proportional to the predetermined relative portions of the desired, final mixture of said substances when said additional substances are fed consecutively to said weighing means, and voltage-responsive means operatively associated with said weighing means for determining the stopping point for flow of the respective additional substances to said weighing means when the respective predetermined relative proportions of said additional substances have been fed to said weighing means.

7. Apparatus as claimed in claim 6 wherein said voltage-responsive means includes a voltage difference measuring instrument and a control device operable to stop said feed of said additional substances upon phase inversion in said voltage measuring instrument.

References Cited

UNITED STATES PATENTS

| | | | |
|---|---|---|---|
| 2,766,981 | 10/1956 | Lauler et al. | 177—211 |
| 2,801,874 | 8/1957 | MacGeorge | 177—211 |
| 2,926,010 | 2/1960 | Kennaway et al. | 177—164 XR |
| 2,938,701 | 5/1960 | Thorsson et al. | 177—70 |
| 3,004,617 | 10/1961 | Burdick et al. | 177—70 XR |
| 3,081,831 | 3/1963 | Thorsson | 177—211 XR |
| 3,125,176 | 3/1964 | Bale et al. | 177—211 XR |
| 3,204,711 | 9/1965 | Boadle et al. | 177—70 |
| 3,221,828 | 12/1965 | Kohler | 177—70 XR |
| 3,254,728 | 6/1966 | Aquadro et al. | 177—122 XR |
| 3,259,199 | 7/1966 | Noble et al. | 177—210 XR |

ROBERT S. WARD, JR., Primary Examiner

U.S. Cl. X.R.

177—122, 164, 210, 212